United States Patent [19]
Valentine et al.

[11] Patent Number: 6,044,263
[45] Date of Patent: Mar. 28, 2000

[54] METHOD FOR PROVIDING A LOCATION INDEPENDENT DIALING PROCEDURE WITHIN A MOBILE TELECOMMUNICATIONS NETWORK

[75] Inventors: Eric Valentine, Plano; Vladimir Alperovich, Dallas, both of Tex.

[73] Assignee: Ericsson Inc., Research Triangle Park, N.C.

[21] Appl. No.: 08/768,523

[22] Filed: Dec. 18, 1996

[51] Int. Cl.⁷ ................................ H04Q 7/38
[52] U.S. Cl. .................. 455/414; 455/419; 455/434; 455/435; 455/456
[58] Field of Search ................. 455/433, 551, 455/558, 419, 432, 435, 436, 517, 552, 434, 566, 456, 426, 414; 379/357

[56] References Cited

U.S. PATENT DOCUMENTS

| | | |
|---|---|---|
| 4,677,653 | 6/1987 | Weiner et al. . |
| 5,003,629 | 3/1991 | Ness-Cohn et al. . |
| 5,020,091 | 5/1991 | Krolopp et al. . |
| 5,101,500 | 3/1992 | Marui . |
| 5,159,625 | 10/1992 | Zicker . |
| 5,255,307 | 10/1993 | Mizikovsky . |
| 5,428,666 | 6/1995 | Fyfe et al. . |
| 5,442,806 | 8/1995 | Barber et al. . |
| 5,463,675 | 10/1995 | Gerszberg . |
| 5,657,373 | 8/1997 | Hermansson et al. ............ 455/435 |
| 5,732,348 | 3/1998 | Norimatsu ........................ 455/434 |
| 5,752,186 | 5/1998 | Malackowski et al. ........... 455/414 |
| 5,761,618 | 6/1998 | Lynch et al. ..................... 455/419 |
| 5,784,693 | 7/1998 | Barber et al. ..................... 455/434 |
| 5,787,354 | 7/1998 | Gray et al. ....................... 455/456 |

FOREIGN PATENT DOCUMENTS

| | | |
|---|---|---|
| 785634 | 7/1997 | European Pat. Off. . |
| 92/19078 | 10/1992 | WIPO . |
| 97/30561 | 8/1997 | WIPO . |

OTHER PUBLICATIONS

Nokia Mobile Phones, "Service Manuel", Jan. 1992.
Ballard, et al "Cellular Mobile Radio Intelligent Network Application", 1989.
WEIB, et al "System 900: The ISON Approach to Cellular Mobile Radio", 1989.
EIA/TIA, "Mobile Station–Land Station Compatibility", Apr. 1989.
Bellcore, ISON–Based C Interface Access for GSM CDCS 1900), Aug. 1995.
European digital cellular telecommunications system (Phase 2); Numbering, addressing and identification (GSM 03.03); *European Telecommunication Standard*, ETS 300.523, Mar. 1995, Second Edition.

*Primary Examiner*—William Cumming
*Attorney, Agent, or Firm*—Jenkens & Gilchrist, P.C.

[57] ABSTRACT

A memory register correlating an access code for accessing a particular long distance carrier within a particular telecommunications network is coupled either to a mobile station or to a telecommunications node serving the mobile station. Whenever the mobile station travels outside of its home Public Land Mobile Network (PLMN) and dials an access code in an attempt to access that particular long distance carrier, an application module associated with the mobile station or the telecommunications node automatically determines the current network serving the mobile station and converts the dialed access code to another access code appropriate for accessing the desired long distance carrier within the current PLMN. A call connection, thereafter, is established with the indicated long distance carrier utilizing the converted access code.

22 Claims, 8 Drawing Sheets

METHOD FOR PROVIDING A LOCATION INDEPENDENT DIALING PROCEDURE WITHIN A MOBILE TELECOMMUNICATIONS NETWORK

BACKGROUND OF THE INVENTION

1. Technical Field of the Invention

The present invention relates to a telecommunications network and, in particular, to the provision of a roaming independent dialing procedure for accessing a long distance carrier within a mobile telecommunications network.

2. Description of Related Art

Whenever a mobile station travels into a new Mobile Switching Center (MSC) coverage area or a subscriber turns on his or her mobile station for the first time, the mobile station attempts to register with the serving MSC by transmitting an associated identification number known as the International Mobile Subscriber Identity (IMSI) number. The serving MSC then communicates with a particular home location register (HLR) associated with the mobile station using the received IMSI number. This communication is to inform the HLR of the mobile station's new location and to retrieve requisite subscriber information from the HLR to provide mobile service to the newly registering mobile station. As a result, because of such a "roaming" arrangement and location update procedures, a mobile station is able to freely access mobile service through a number of different MSCs not only within its home Public Land Mobile Network (PLMN), but also within a visiting PLMN.

With the introduction of inter-network compatibility and protocol interfaces within a mobile telecommunications environment, such as the Global System for Mobile (GSM) and Personal Communications System (PCS) telecommunications standards, a mobile station is not only able to travel (roam) between a first PLMN and a second PLMN, but also between a first PLMN within a first country and a second PLMN within a second country. Especially in Europe, a mobile subscriber is able to travel across a number of different European countries supporting the GSM standard and receive incoming calls and originate outgoing calls using the same mobile station.

Additionally, utilizing the above described mobile telecommunications network, mobile subscribers are provided with a number of advanced subscriber features and services. One such service enables a mobile subscriber to specify his or her preferred long distance carrier while making long-distance calls. As an illustration, a mobile subscriber specifies a particular long distance carrier by dialing an access code associated with that long distance carrier, such as *10288 for AT&T. After receiving a confirmation from AT&T, the mobile subscriber then dials his or her destination B-number. A long distance call connection is thereafter established by AT&T and the mobile subscriber is charged in accordance with his or her subscription agreement with AT&T. As a result, independent of the geographic area, mobile telecommunications network, and the mobile station, mobile subscribers are able to specify and utilize their preferred long distance carriers.

Because each PLMN, or more specifically each country, has its own dialing plans, an access code for establishing a call connection with a desired long distance carrier differs from one geographic location to another. For example, within the United States, the access code *10288 might represent AT&T. In South America, such as Mexico, *12233 or another E.164 formatted directory number might instead represent AT&T. Because of such differences, a mobile subscriber roaming between a number of different networks or countries needs to inconveniently maintain an appropriate list identifying the correct access code associated with each network, and then manually dial the proper access code. Such inconveniences are further aggravated by the fact that the mobile subscriber may not even know the access number for his or her long distance carrier within the current network.

Accordingly, there is a need for a mechanism to provide a location independent access code dialing procedure within a mobile telecommunications network.

SUMMARY OF THE INVENTION

An indication is received at a mobile station from a mobile subscriber to access a particular long distance carrier service. A determination is then made as to which particular mobile telecommunications network is currently serving the mobile station. Utilizing the determined location data, an appropriate access code for the desired long distance carrier associated with the current mobile telecommunications network is then determined. Thereafter, a connection to the indicated long distance carrier service is established utilizing the determined access code.

As a first embodiment, the identity of the serving mobile telecommunications network is determined by the mobile station. Whenever the mobile station enters a new geographic area, data identifying the current location are received by the mobile station. Such data comprises a Cell Global Identity (CGI) representing the current network and cell identities serving the mobile station. Analyzing the received CGI, the mobile station is able to determine its current location. Utilizing the determined location, the mobile station then retrieves the correlated access code from an attached Subscriber Identity Module (SIM) card.

As an alternative, a determination to ascertain the current location of the mobile station is made within a telecommunications node. As an illustration, such a determination is made within a home location register (HLR) associated with the mobile station. The mobile station transmits a signal towards the associated HLR. The HLR determines the current location of the mobile station, retrieves the appropriate access code associated with the current location of the mobile station, and communicates the retrieved access code back to the mobile station. The mobile station then utilizes the received access code to originate an outgoing call connection towards the desired long distance carrier service. Such communications between the mobile station and the HLR are facilitated via Unstructured Supplementary Service Data (USSD) messages.

As a further alternative, such a location determination can further be made within an external USSD handler node associated with the HLR.

As yet another alternative, an intelligent network (IN) node, such as a Service Control Point (SCP), connected to the serving mobile telecommunications network determines the appropriate access code associated with current location of the mobile station. The mobile station transmits a USSD message requesting an access code to the serving mobile switching center/visitor location register (MSC/VLR). The MSC/VLR, in turn, transmits a connection-less signal to the connected SCP via the HLR. The transmitted connection-less signal may include the current location data, or the SCP may communicate with an HLR associated with the mobile station to retrieve the location data. Upon ascertaining the current location of the mobile station, the SCP retrieves the appropriate access code from its memory location. The determined access code is then forwarded back to the serving MSC/VLR. The serving MSC/VLR then communicates the access code back to the requesting mobile station via another USSD message. Utilizing the received access code, the mobile station originates an outgoing call connection towards the desired long distance carrier service.

As yet another embodiment of the present invention, the serving MSC/VLR can determine the appropriate access code associated with the current location. During a location update procedure with the HLR associated with the mobile station, the MSC/VLR copies location dependent access codes from the HLR and stores them within its associated registers. Thereafter, whenever the mobile station requests a call connection towards a particular long distance carrier service, the serving MSC/VLR retrieves the appropriate access code from its registers. Utilizing the retrieved access code, the serving MSC/VLR then originates an outgoing call connection towards the desired long distance carrier service.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
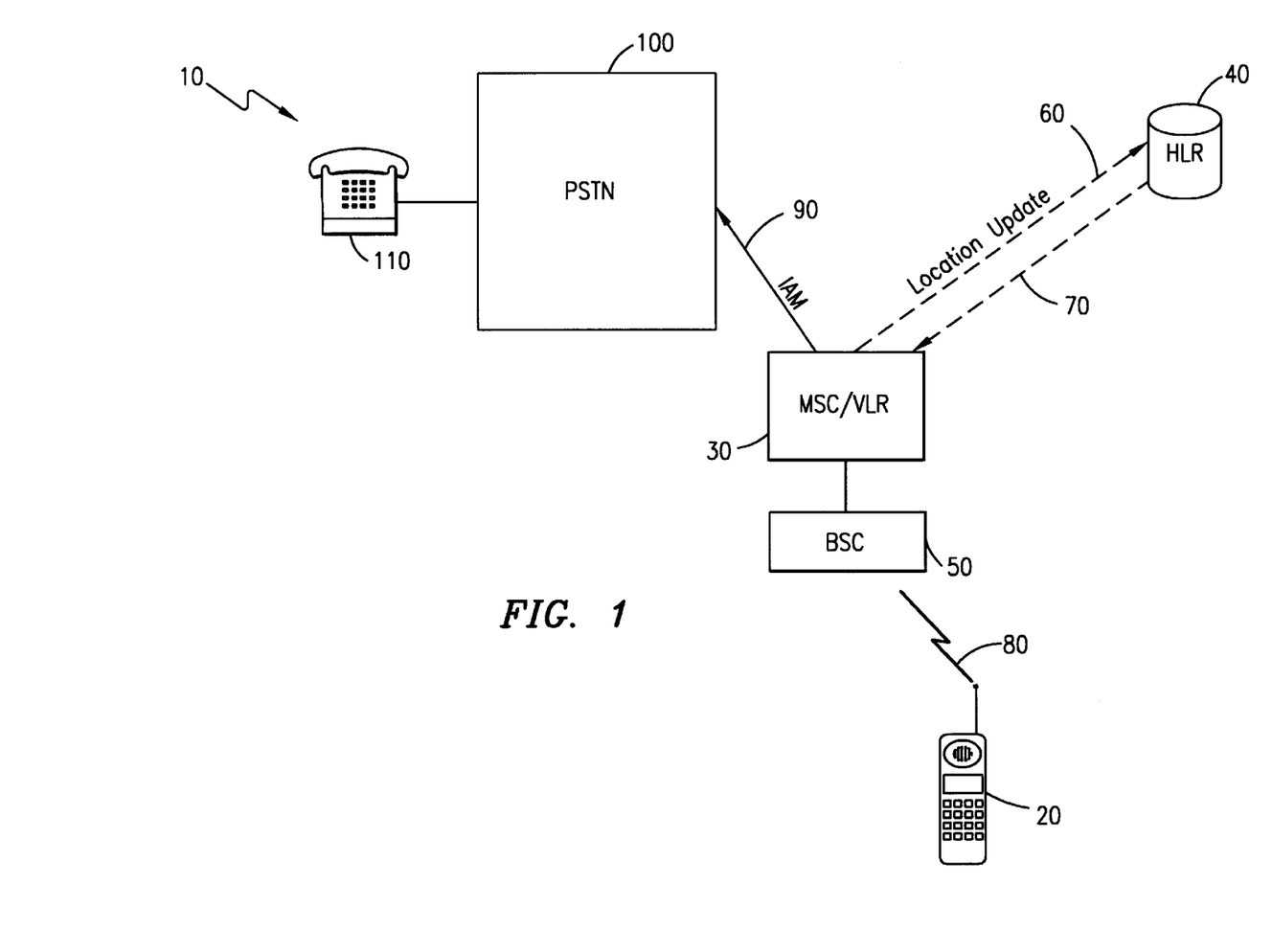
FIG. 1 is a block diagram of a public land mobile network (PLMN) providing mobile service to a mobile station.

FIG. 1 is a block diagram of a public land mobile network (PLMN) 10 providing mobile telecommunications service to a mobile station 20. Whenever the mobile station 20 travels into a particular geographic area serviced by a mobile switching center/visitor location register (MSC/VLR) 30, a determination is made by the mobile station 20 that the mobile station 20 has entered a new service area. Thereafter, the mobile station 20 attempts to perform a location update procedure with its associated home location register (HLR) 40. Such a location update procedure is to inform the HLR of the mobile station's new location and to enable the serving MSC/VLR 30 to retrieve requisite subscriber information from the HLR 40. Such retrieved subscriber information is then utilized by the serving MSC/VLR 30 to provide mobile service to the newly registering mobile station 20. Accordingly, after receiving a signal, such as a Direct Transfer Application Part (DTAP) message (including an International Mobile Subscriber Identity (IMSI) number), from the mobile station via a base station controller (BSC) 50, the serving MSC/VLR 30 performs a location update 60 with the HLR 40 associated with the received IMSI number. As a result, the HLR 40 stores the identity of the MSC/VLR 30 currently serving the mobile station 20. Additionally, requisite subscriber information, such as subscriber feature data, is also downloaded to the serving MSC/VLR via another signal 70.

Thereafter, whenever the mobile station 20 requests an outgoing call connection 80, for example, by dialing a particular directory number associated with a wireline terminal 110, the serving MSC/VLR 30 transmits a call setup signal, such as an Initial Address Message (IAM) 90, to a connected Public Switched Telephone Network (PSTN) 100. As a result, a call connection is established therebetween.

Figure 2:
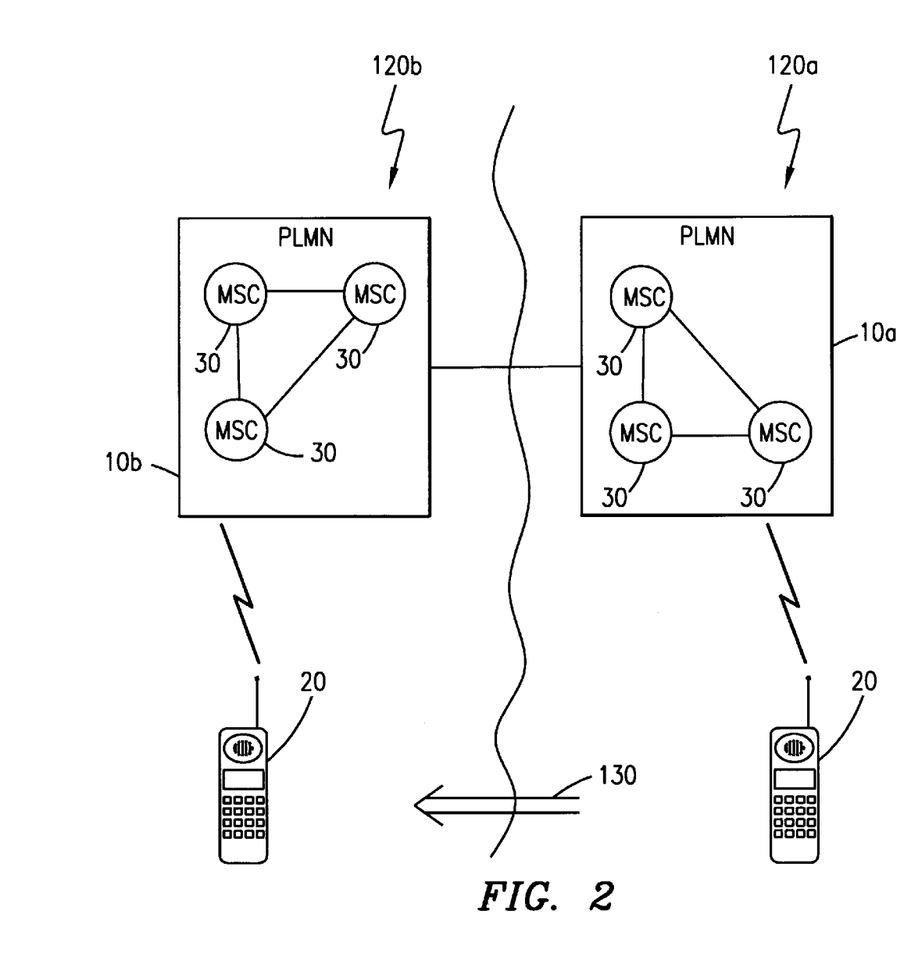
FIG. 2 is a block diagram of multiple PLMNs providing mobile service to a roaming mobile station.

FIG. 2 is a block diagram of multiple PLMNs providing mobile service to a roaming mobile station 20. Because of the above illustrated roaming capabilities and other internetwork compatibilities, the mobile station 20 is not only able to roam between a first PLMN 10*a* and a second PLMN 10*b*, but also between the first PLMN 10*a* within a first country 120*a* and the second PLMN 10*b* within a second country 120*b* (roaming 130). Each time the mobile station 20 travels into a new MSC/VLR coverage area, a corresponding MSC 30 and the mobile station 20 perform a location update to enable the mobile telecommunications network to keep track of the mobile station 20 and to provide necessary mobile service to the traveling mobile station 20.

Within a typical PLMN, a number of different long distance carriers are usually available to provide long distance service to mobile stations. Accordingly, each time a mobile station wishes to originate a long distance call within a visiting network, the mobile subscriber needs to specify his or her desired long distance carrier to the serving mobile network. Otherwise, a default long distance carrier associated with the serving mobile telecommunications network, exchange, or subscriber is utilized. As an illustration, in order to utilize AT&T as his or her long distance carrier, the mobile subscriber initially dials an access code representing AT&T. After receiving a confirmation from AT&T, the mobile subscriber then dials a destination B-number to originates an outgoing long distance call. A call connection is thereafter established by AT&T and the mobile subscriber is charged in accordance with his or her AT&T subscription agreement. As a result, regardless of which long distance carrier the serving MSC/VLR has designated as a default carrier, mobile subscribers are freely able to choose and utilize their own long distance carriers.

However, because each PLMN, or more particularly each country, has its own dialing plans, an access code or access number representing a particular long distance carrier may differ from one geographic location to another. Consequentially, a mobile subscriber must inconveniently maintain a list of access code associated with each network. As the mobile subscriber travels from one network to another, the mobile subscriber must then determine the appropriate access code associated with the current location and manually dial the determined access code to acquire access to the desired long distance carrier.

Figure 3:
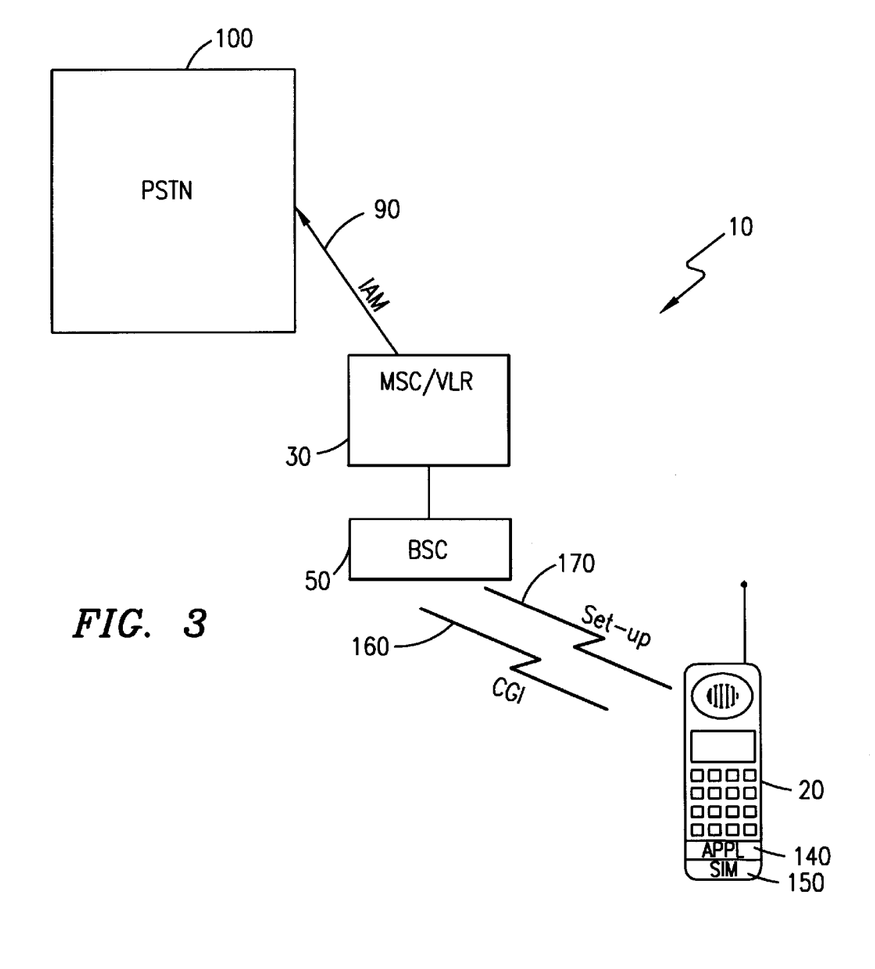
FIG. 3 is a block diagram of a PLMN illustrating a mobile station providing a location dependent access code within the current location.

FIG. 3 is a block diagram of a PLMN 10 illustrating a mobile station 20 providing a location dependent access code within the current location in accordance with the teachings of the present invention. Whenever the mobile station 20 travels into a particular geographic area, such as a cell area, served by a MSC/VLR 30, the mobile station 20 receives data identifying the current location from the associated base station controller (BSC) 50. Such data include a Cell Global Identity (CGI) 160 identifying the current network and cell area serving the mobile station 20.

Attached to the mobile station 20 is a Subscriber Identity Module (SIM) card 150 storing a list of access codes along with its associated location information. By utilizing the received CGI data, the application module 140 is able to retrieve the appropriate access code for the current location. Utilizing the retrieved access code, the mobile station 20 then originates a call setup message 170 towards the particular long distance carrier service. If the desired long distance carrier service is associated with a connected PSTN 100, the serving MSC/VLR 30 further transmits a call setup message, such as an IAM 90, to the connected PSTN 100. As a result, a connection with the indicated long distance carrier is established. After authenticating the mobile subscriber, the long distance carrier, such as AT&T, receives a B-number from the mobile station. A long distance call connection to the desired called party is accordingly established thereafter.

Figure 4:
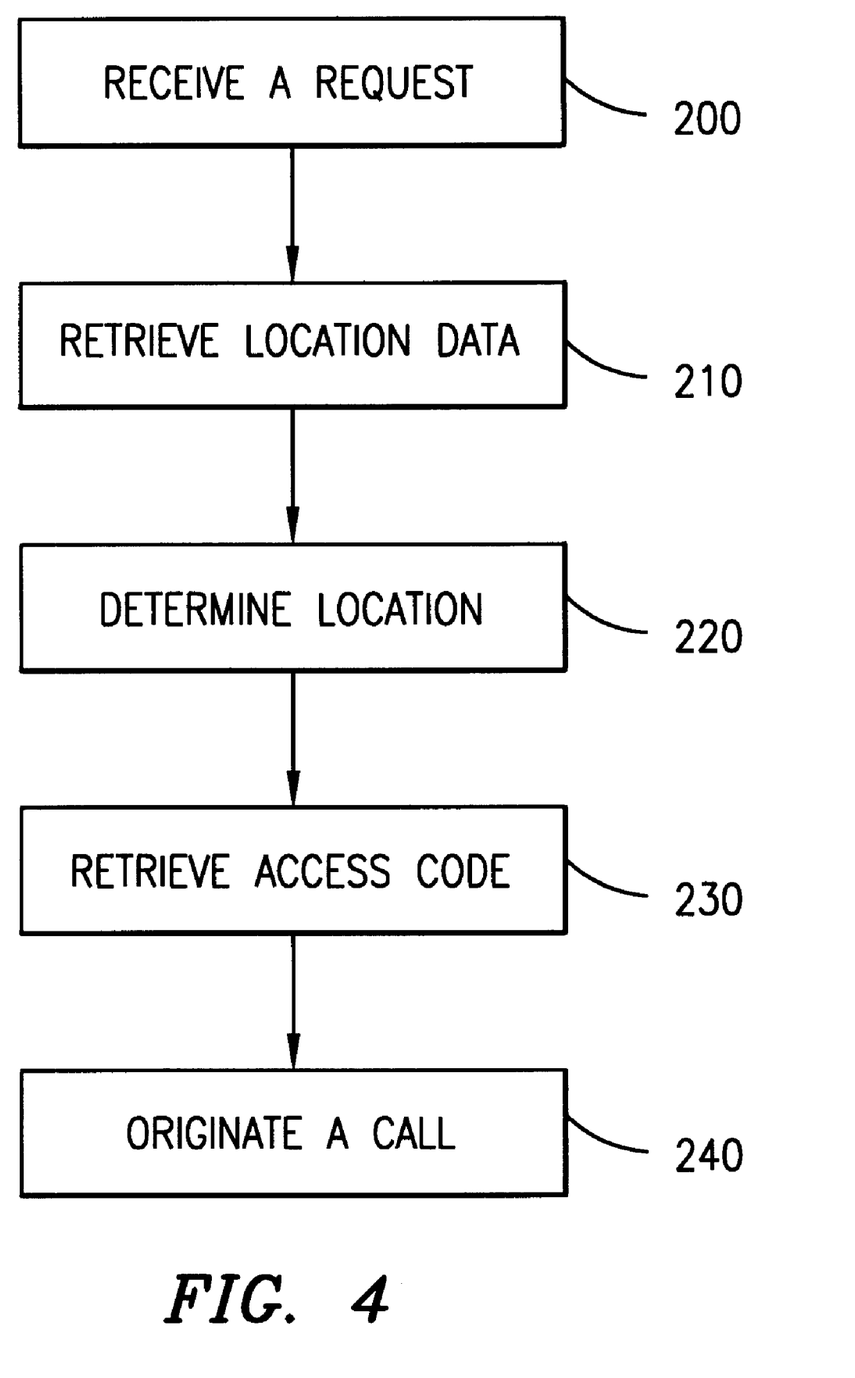
FIG. 4 is a flowchart illustrating the steps performed by a mobile station to access a desired long distance carrier service within a PLMN.

FIG. 4 is a flowchart illustrating the steps performed by a mobile station to access a desired long distance carrier service within a serving PLMN. The mobile station initially receives a request to dial a location dependent access code at step 200. Such a request may be a particular service code or function key, or it may further be an access code capable of identifying the desired long distance carrier service within the mobile subscriber's home PLMN. As an illustration, *10266 identifies AT&T within the mobile subscriber's home PLMN. Upon recognizing that the mobile subscriber wishes to access a particular long distance carrier, an application module associated with the mobile station then retrieves location data, such as CGI data, previously received from the serving mobile telecommunications network at step 210. Analyzing the retrieved CGI data, the application module is able to ascertain the current location or network currently serving the mobile station at step 220. Utilizing the determined location, the application module then retrieves an access code correlated with the current location from the attached SIM card at step 230. The retrieved location dependent access code is then used as a destination address by the mobile station to originate an outgoing call connection at step 240. As a result, a call connection with the desired long distance carrier service is established therewith.

Figure 5:
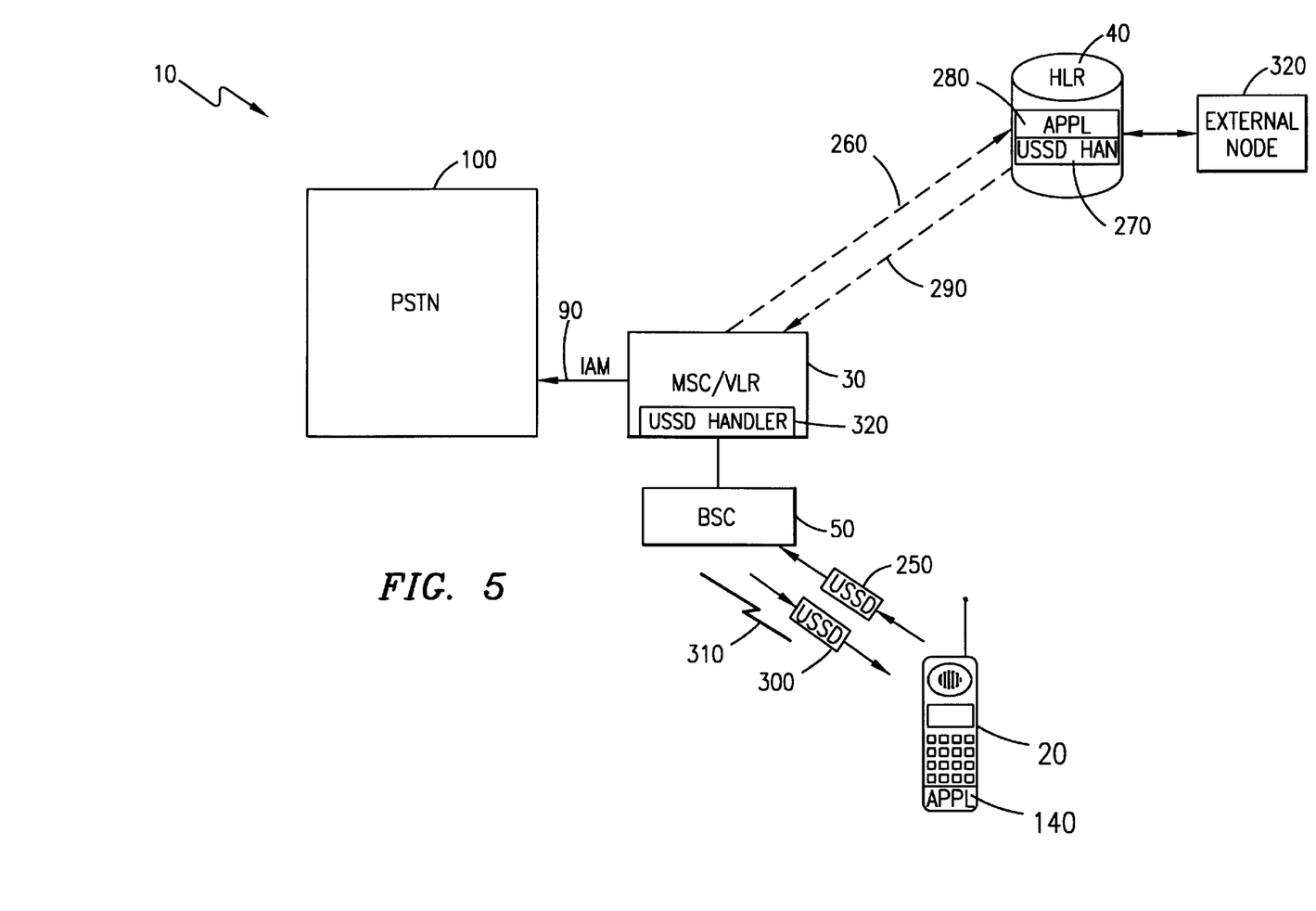
FIG. 5 is a block diagram of a PLMN illustrating a home location register (HLR) providing a location dependent access code to a roaming mobile station.

FIG. 5 is a block diagram of a PLMN 10 illustrating a home location register (HLR) 40 providing a location dependent access code to a roaming mobile station 20. Whenever a mobile subscriber requests an access to a particular long distance carrier service, an application module 140 associated with the mobile station 20 transmits unstructured data to the serving MSC/VLR 30 via BSC 50. Such unstructured data comprise a Unstructured Supplementary Service Data (USSD) message 250 transmitted over a Stand-alone Dedicated Control Channel (SDCCH). The transmitted USSD message further includes an indication identifying the mobile subscriber preferred long distance carrier service. As described fully above, such an indication includes a service code or an access code associated with the home PLMN. Upon receiving the USSD message 250, a USSD handler 320 associated with the serving MSC/VLR 30 reviews the final destination specified by the USSD message and determines that the USSD message 250 needs to be forwarded to the HLR 40. As a result, the received USSD message 260 is further transmitted from the serving MSC/VLR 30 to the associated HLR 40. Another USSD handler 270 associated with the HLR 40 then receives the transmitted USSD message 260 and determines that the received message has reached its final destination. An application module 280 associated with the HLR 40 then determines which access code should be utilized by the mobile station 20 to properly access the desired long distance carrier within the current geographic area.

When the mobile station 20 initially roamed into the current MSC/VLR coverage area, as fully described above, the mobile station and the serving MSC/VLR 30 performed a location update to inform the HLR 40 of the mobile station's current location. Utilizing such location data and the dialed indication transmitted by the mobile station 20, the application module 280 within the HLR 40 is able to ascertain which long distance carrier within which network or geographic location is currently being attempted to be accessed by the mobile station 20. The application module 280 then determines which access code should be utilized by the mobile station 20 to properly access the desired long distance carrier within the current location. The desired access code associated with the current location is then transmitted back to the MSC/VLR 30 (signal 290). The USSD handler 320 associated with the MSC/VLR 30 then forwards the received access code to the mobile station 20 via another USSD message 300. Upon receiving the current location dependent access code for the desired long distance carrier, the mobile station 20 then transmits a call setup signal 310 utilizing the received access code. As an example, if the desired AT&T service is being provided within the connected PSTN 100, the serving MSC/VLR 30 further originates an outgoing call connection 90 using the received access code. As a result, a call connection to the desired long distance company or service is established.

Figure 6:
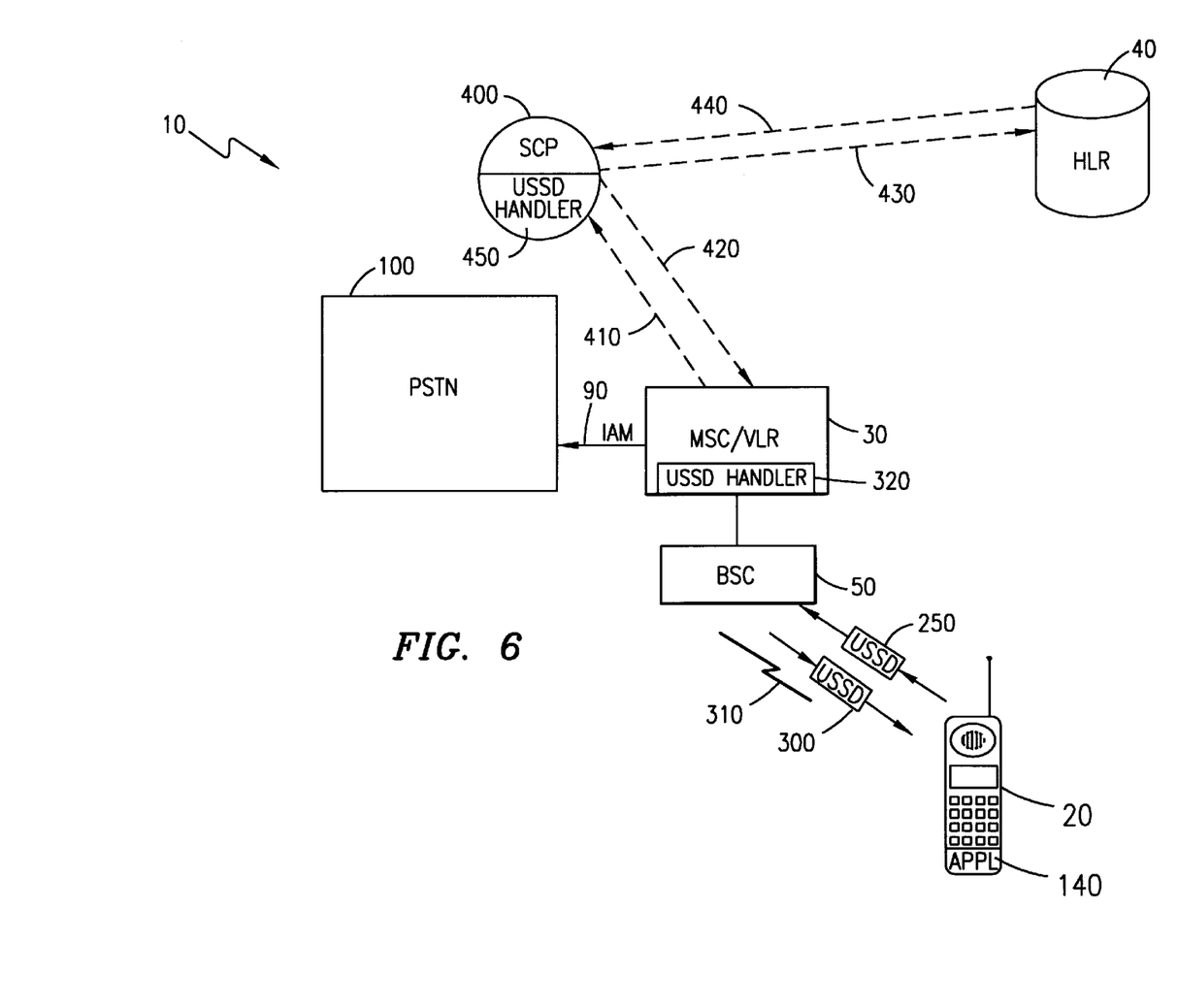
FIG. 6 is a block diagram of a telecommunications network illustrating a service control point (SCP) interacting with a mobile switching center/visitor location register (MSC/VLR) to provide an appropriate access code to a roaming mobile station.

Reference is now made to FIG. 6 illustrating a service control point (SCP) 400 interacting with an MSC/VLR 30 to provide an appropriate access code to a roaming mobile station 20. As another embodiment of the present invention, a USSD handler 450 associated with the SCP 400 determines the appropriate access code associated with the PLMN 10 currently serving the mobile station 20. In accordance with the teachings of the present invention, the application module 140 associated with the mobile station 20 transmits a USSD message 250 to the SCP 400. The transmitted USSD message 250 includes the access code dialed by the mobile subscriber and identifying a particular long distance carrier associated with the home PLMN. The USSD handler 320 associated with the serving MSC/VLR 30 receives the transmitted USSD message 250 via the BSC 50 and determines that the message is intended for the SCP 400. As a result, the received USSD message is transmitted to a USSD handler 450 associated with the SCP 400. Utilizing its associated table correlating each network or geographic location with an appropriate access code for a particular long distance carrier, the SCP 400 determines the access code to be used by the mobile station 20 to acquire access to the desired long distance carrier. As an alternative, if data representing the current location of the mobile station have not been provided by the serving MSC/VLR 30, the SCP 400 may further communicate with the HLR 40 to ascertain the current location of the mobile station. As fully described above, such data are communicated by the serving MSC/VLR 30 and maintained by the HLR 40 to keep track of the current location of the mobile station 20. Accordingly, the SCP 400 transmits a connection-less signal 430, such as a Signaling Connection Control Part (SCCP) based signal, to the HLR 40 requesting the current location of the mobile station 20. Retrieving the data previously updated by the location update procedure, the data identifying the current location of the mobile station are transmitted back to the requesting SCP 400 (signal 440). Utilizing the received location data, the SCP 400 then ascertains the appropriate access code applicable for accessing the desired long distance carrier within the current mobile telecommunications network. The ascertained access code is then communicated back to the serving MSC/VLR 30 (signal 410). The USSD handler 320 associated with the serving MSC/VLR 30 then further forwards the received message to the mobile station 20 (signal 300). The mobile station 20 then originates an outgoing call connection 310 utilizing the received access code to the serving MSC/VLR 30. The serving MSC/VLR 30 may further transmit a call setup message, such as an IAM message 90, to effectuate a connection to the indicated long distance carrier. As a result, a call connection to the desired long distance carrier service is achieved.

As an alternative, the signals 410–420 communicated between the SCP 400 and the MSC/VLR 30 may further comprise other SCCP based signals, such as a Transaction Capability Application Part (TCAP) or Intelligent Application Part (INAP) based signals. After receiving the USSD message 250 from the mobile station 20, the serving MSC/VLR 30 transmits a TCAP or INAP signal to the SCP 400 requesting an appropriate access code to be used. In a similar manner as described above, the SCP 400 determines the correct access code associated with the current location and communicates the determined access code back to the serving MSC/VLR 30 via another INAP or TCAP signal.

Figure 7:
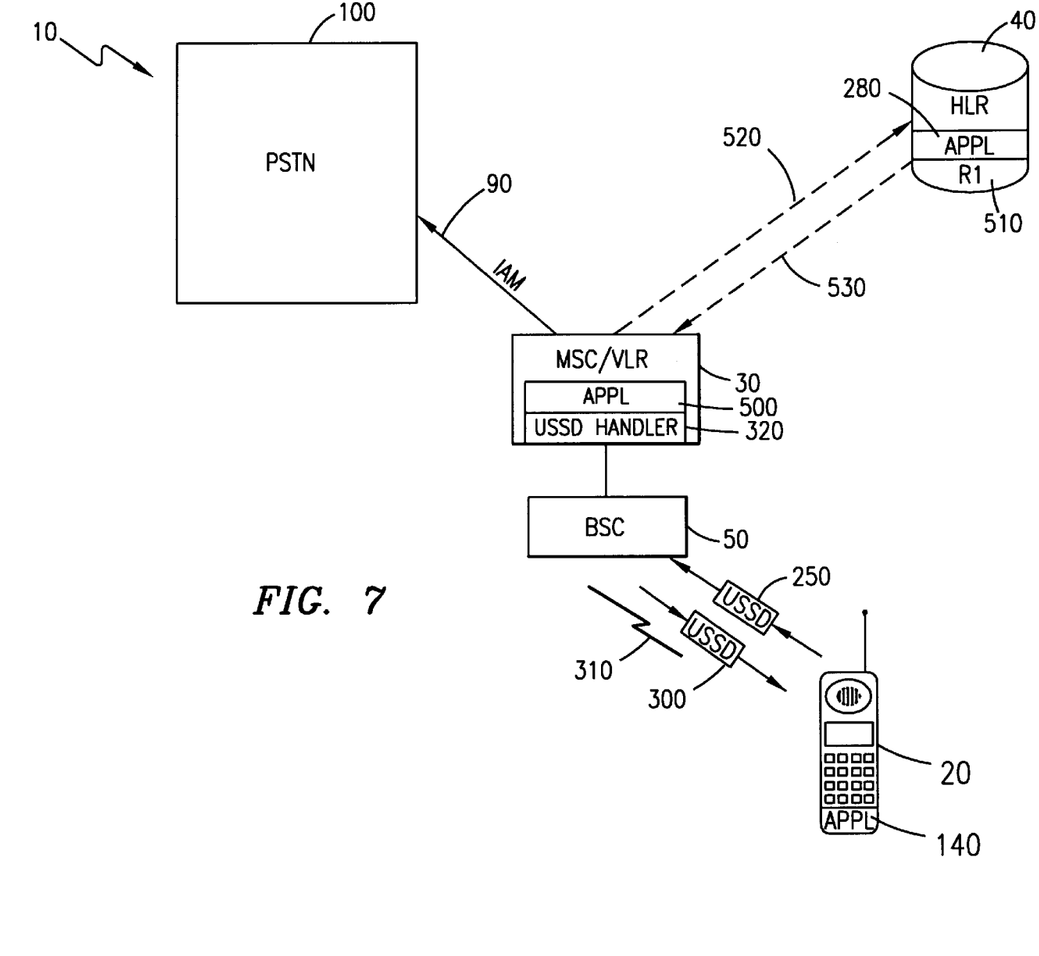
FIG. 7 is a block diagram of a PLMN illustrating a serving MSC/VLR communicating with an HLR to provide a location dependent access code to a roaming mobile station.

Reference is now made to FIG. 7 illustrating yet another embodiment of the present invention. The mobile subscriber associated with the mobile station 20 dials an access code identifying a particular long distance carrier service, but not recognizable within the visiting PLMN. In order to ascertain the appropriate access code identifying the same long distance carrier within the current visiting PLMN, the application module 140 associated with the mobile station 20 transmits the USSD message 250 containing the subscriber dialed access code to the serving MSC/VLR 30. The USSD handler 320 associated with the serving MSC/VLR 30 receives the transmitted USSD message 250 via the attached BSC 50. Upon realizing that the received USSD message 250 is intended for the serving MSC/VLR 30, an application module 500 is invoked. The application module 500 then further transmits a signal 520 containing the subscriber dialed access code to the HLR 40 associated with the requesting mobile station 20. Such a signal includes a Mobile Application Part (MAP) or other SCCP based signal. The HLR 40 already contains data R1 510 representing the current location of the mobile station 20 and received from the previous location update procedure. Utilizing such location data along with the received access code, an application module 280 associated with the HLR 40 then determines which long distance carrier is being attempted to be accessed within the current mobile telecommunications network. The application module then determines the access code appropriate for acquiring access to the desired long distance carrier within the current geographic location. Such a determined access code is then transmitted back to the serving MSC/VLR 30 via another MAP based signal 530. The application module 500 associated within the serving MSC/VLR 30 then forwards the received access code to the mobile station 20 via another USSD message 300. As illustrated above, the mobile station 20 then originates an outgoing call connection towards the serving MSC/VLR 30 utilizing the received access code. In a similar manner, a call setup message, such as an IAM message 90, may further be transmitted to the connected PSTN 100 to effectuate a call connection with the desired long distance carrier service.

Figure 8:
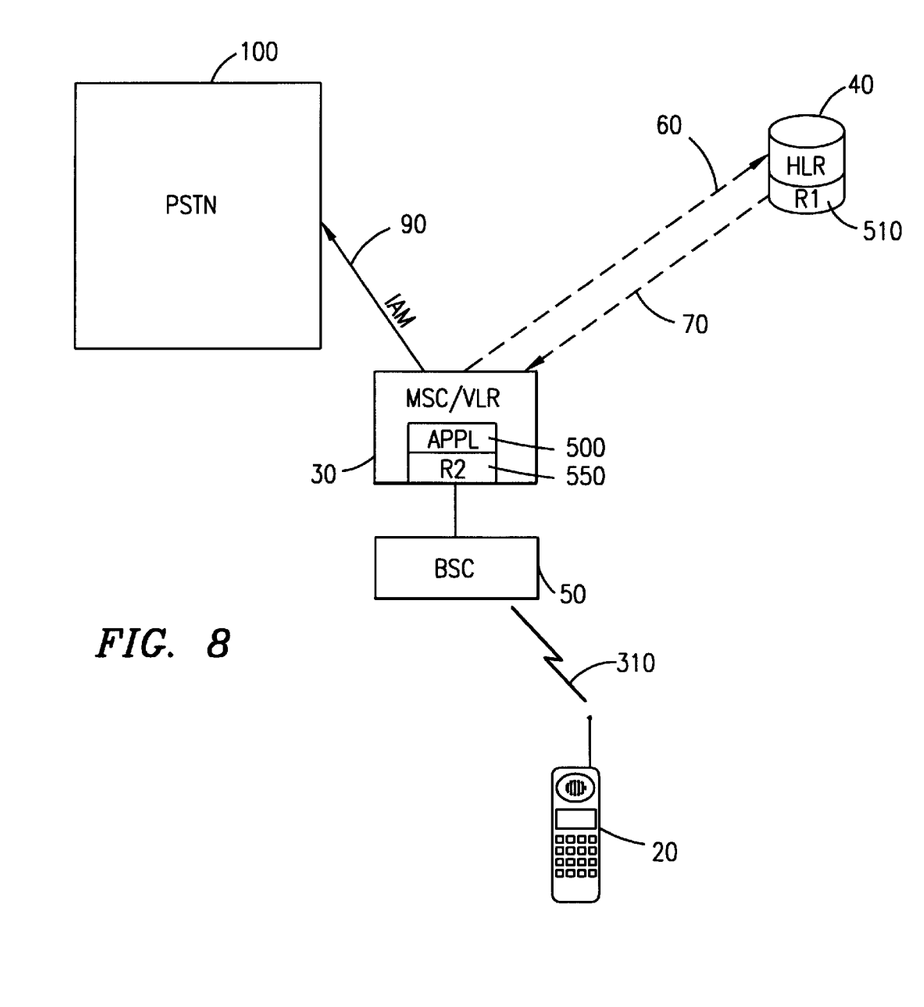
FIG. 8 is a block diagram of a PLMN illustrating a serving MSC/VLR providing an appropriate access code to a roaming mobile station.

As yet another embodiment of the present invention, reference is now made to FIG. 8 illustrating a serving MSC/VLR 30 providing an appropriate access code for a roaming mobile station 20. The HLR 40 associated with the mobile station 20 has access to a register R1 510 for storing appropriate access codes for each mobile telecommunications network. Whenever the mobile station 20 roams into a particular MSC coverage area or into a new network area, as fully described above, the mobile station 20 in conjunction with the new MSC/VLR 30 performs a location update with the HLR 40 (signal 60). The HLR 40 is, in turn, informed of the mobile station's current location. Utilizing such location data, the HLR 40 then retrieves the appropriate access codes for all relevant long distance carriers for that particular serving network from the register R1 510. The retrieved data are then downloaded or copied to a register R2 550 associated with the serving MSC/VLR 30 (signal 70).

The mobile subscriber thereafter dials an access code not recognizable within the current PLMN. The mobile station 20, in accordance with the teachings of the present invention, originates an outgoing call connection 310 without altering the received access code to the serving MSC/VLR 30. An application module 500 associated with the serving MSC/VLR 30 then access the register R2 550 and converts the received access code identifying a particular long distance carrier within the home PLMN to an appropriate access code identifying the same within the current PLMN. Utilizing the retrieved access code as the new called party number, an access to the desired long distance carrier service is effectuated.

Accordingly, utilizing the above embodiments fully described above, a roaming mobile subscriber is able to access his or her preferred long distance carrier while utilizing the same access code. The mobile station or the mobile telecommunications network automatically ascertains the current location of the mobile station, determines the appropriate access code, and conveniently establishes a call connection with the specified long distance carrier.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for accessing a telecommunications service for a mobile station within a plurality of telecommunications networks, said telecommunications service identified by a particular access number within each of said plurality of telecommunications networks, said method comprising the steps of:

receiving at a mobile station an indication to access a particular telecommunications service;

determining a particular one of said plurality of telecommunications networks currently serving said mobile station, said serving telecommunications network including a home location register (HLR) associated with said mobile station;

transmitting a first data packet containing said indication from said mobile station to said HLR;

transmitting a second data packet containing said access number from said HLR to said mobile station; and accessing said telecommunications service from said mobile station using said identified access number.

2. The method of claim 1 wherein said step of determining said serving telecommunications network is performed within said mobile station.

3. The method of claim 2 wherein said step of identifying said particular access number further comprises the step of retrieving said particular access number from a subscriber identity module (SIM) card associated with said mobile station.

4. The method of claim 2 wherein said step of determining said serving telecommunications network further comprises the step of receiving at said mobile station data identifying said serving telecommunications network over-the-air from said serving telecommunications network.

5. The method of claim 4 wherein said data comprises Cell Global Identity (CGI) data representing said serving telecommunications network.

6. The method of claim 1 wherein said step of determining said serving telecommunications network and said step of identifying said particular access number are performed within a telecommunications node associated with said serving telecommunications network.

7. The method of claim 1 wherein said first and second data packets comprise Unstructured Supplementary Service Data (USSD) messages.

8. The method of claim 1 further comprises the steps of:
receiving at a mobile switching center (MSC) serving said mobile station said first data packet including said indication from said mobile station;
transmitting a first connection-less signal including said indication from said MSC to said HLR;
transmitting a second connection-less signal including said access number from said HLR to said MSC;
transmitting said second data packet including said access code from said MSC to said mobile station; and
originating an outgoing call connection from said mobile station using said received access number.

9. The method of claim 8 wherein said first and second connection-less signals comprise Mobile Application Part (MAP) based signals.

10. The method of claim 6 wherein said telecommunications node comprises a mobile switching center (MSC) serving said mobile station.

11. The method of claim 10 wherein said MSC receives said access number associated with said indication from a home location register (HLR) associated with said mobile station during a location register process.

12. The method of claim 11 further comprises the steps of:
receiving at said MSC said indication from said mobile station;
retrieving said access number associated with said indication and received from said HLR; and
accessing said telecommunications service using said retrieved access number.

13. A method for accessing telecommunications service for a mobile station within a plurality of telecommunications networks, said telecommunications service identified by a particular access number within each of said plurality of telecommunications networks, said method comprising the steps of:
receiving at a mobile telecommunications node a first signal transmitted from a mobile station, said first signal requesting an access number identifying a particular telecommunications service associated with a telecommunications network serving said mobile station;
transmitting said first signal from said mobile telecommunications node to a home location register (HLR) associated with said mobile station;
determining at said HLR said access number associated with said serving telecommunications network;
receiving at said mobile telecommunications node a second signal from said HLR, said second signal including said determined access number;
transmitting said second signal from said mobile telecommunications node to said mobile station;
receiving a request at said mobile telecommunications node to access said telecommunications service using said access number from said mobile station; and
accessing, in response to said request, said telecommunications service.

14. The method of claim 13 wherein said first and second signals comprise Unstructured Supplementary Service Data (USSD) messages.

15. The method of claim 13 wherein said step of accessing said telecommunications service further comprises the step of accessing a particular long distance carrier service.

16. The method of claim 13 wherein said step of determining said access number is performed at said mobile telecommunications node.

17. The method of claim 13 wherein said mobile telecommunications node comprises a mobile switching center (MSC) serving said mobile station.

18. The method of claim 13 wherein said first and second signals comprise Unstructured Supplementary Service Data (USSD) messages.

19. The method of claim 13 wherein said first and second signals comprise Mobile Application Part (MAP) based signals.

20. The method of claim 13 wherein said first and second connection-less signals comprise Signaling Connection Control Part (SCCP) based signals.

21. The method of claim 1 wherein said step of accessing said telecommunications service further comprises the step of accessing a particular long distance carrier service.

22. A method for accessing telecommunications service for a mobile station within a plurality of telecommunications networks, said telecommunications service identified by a particular access number within each of said plurality of telecommunications networks, said method comprising the steps of:
receiving at a mobile telecommunications node a request signal transmitted from a mobile station, said request signal requesting an access number identifying a particular telecommunications service associated with a telecommunications network serving said mobile station;
transmitting a first connection-less signal from said mobile telecommunications node to a Service Control Point (SCP) associated with said serving telecommunications network requesting said access number;
determining said access number associated with said serving telecommunications network at said SCP;
receiving at said mobile telecommunications node a second connection-less signal from said SCP, said second connection-less signal including said access number;
transmitting a return signal from said mobile telecommunications node to said mobile station, said return signal including said determined access number;
receiving a request at said mobile telecommunications node to access said telecommunications service using said access number from said mobile station; and
accessing, in response to said request, said telecommunications service.

* * * * *

UNITED STATES PATENT AND TRADEMARK OFFICE
CERTIFICATE OF CORRECTION

PATENT NO. : 6,044,263
DATED : March 28, 2000
INVENTOR(S) : Valentine et al.

Page 1 of 1

It is certified that error appears in the above-identified patent and that said Letters Patent is hereby corrected as shown below:

Column 8,
Line 65, Insert "identifying at said HLR said access number associated with said telecommunications service represented by said indication;"

Signed and Sealed this

Fourteenth Day of August, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,044,263
DATED : March 28, 2000
INVENTOR(S) : Valentine et al.

It is certified that error appears in the above-identified patent and that said Letters Patent is hereby corrected as shown below:

Column 10,
Line 31, replace "20. The method of claim 13" with -- 22. The method of claim 21 --
Line 34, replace "21." with -- 20. --
Line 37, replace "22." with -- 21. --

Signed and Sealed this

Twenty-fifth Day of December, 2001

Attest:

Attesting Officer

JAMES E. ROGAN
*Director of the United States Patent and Trademark Office*